United States Patent [19]

Hynes et al.

[11] Patent Number: 4,913,981
[45] Date of Patent: Apr. 3, 1990

[54] BATTERY MARKERS

[76] Inventors: David M. Hynes, 1120 West Pratt, No. Chicago, Ill. 60626; Kenneth P. Mahoney, 1377 Borden Dr., Elgin, Ill. 60120

[21] Appl. No.: 299,627

[22] Filed: Jan. 23, 1989

[51] Int. Cl.⁴ .................. H01M 2/00; H01M 4/36
[52] U.S. Cl. ........................... 429/1; 429/121; 116/205; 283/81; 283/101; 428/41
[58] Field of Search .............. 429/1, 65, 121; 116/205, DIG. 3, DIG. 14, DIG. 17; 283/81; 428/41, 101

[56] References Cited

U.S. PATENT DOCUMENTS

| | | | |
|---|---|---|---|
| 3,160,970 | 12/1964 | Worrell | 283/81 X |
| 3,421,239 | 1/1969 | Smith | 283/81 X |
| 3,936,121 | 2/1976 | Leinberger | 429/1 X |
| 4,033,803 | 7/1977 | Coder | 428/41 X |
| 4,582,251 | 4/1986 | Odem et al. | 116/205 X |

*Primary Examiner*—Stephen J. Kalafut
*Attorney, Agent, or Firm*—Hill, Van Santen, Steadman & Simpson

[57] ABSTRACT

A kit for indicating the polarities of terminals of a battery including a pair of markers formed of wafers made of a hard durable plastic and having plus or minus signs formed on one of the sides thereof, and a double-sided foam adhesive tape attached to the other sides thereof. The markers are readily secured to the surface of a battery near appropriate terminals by simply peeling off a laminate attached to the adhering side of the adhesive tape and sticking the marker on a clean spot on the surface of a battery.

10 Claims, 1 Drawing Sheet

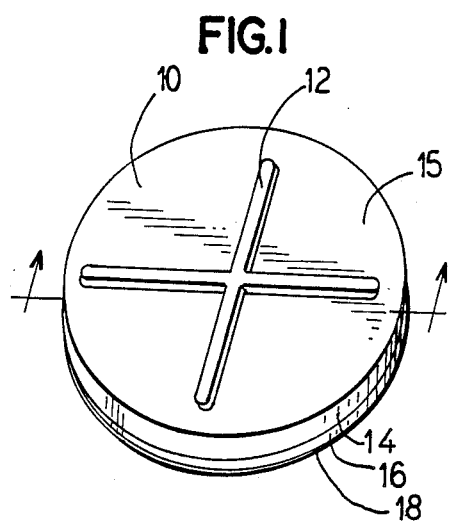
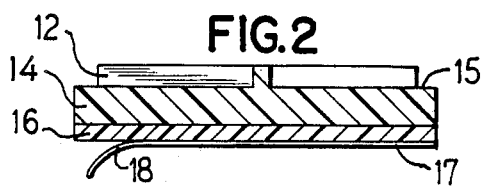
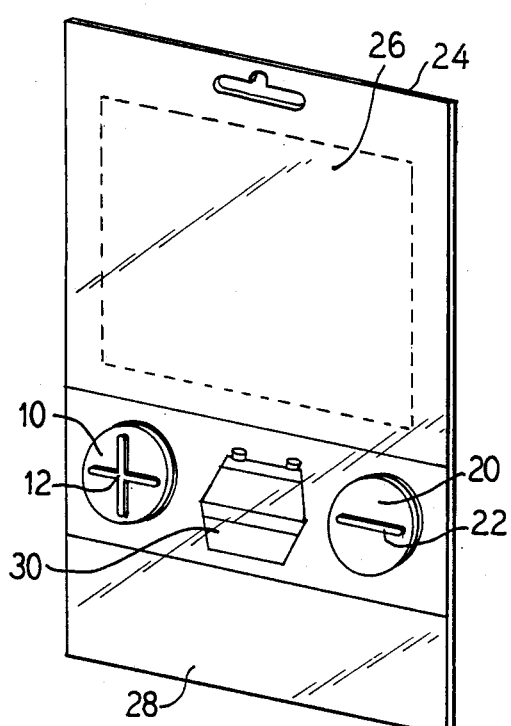
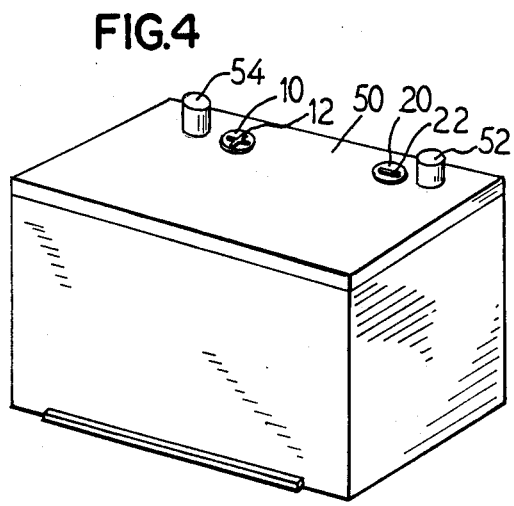
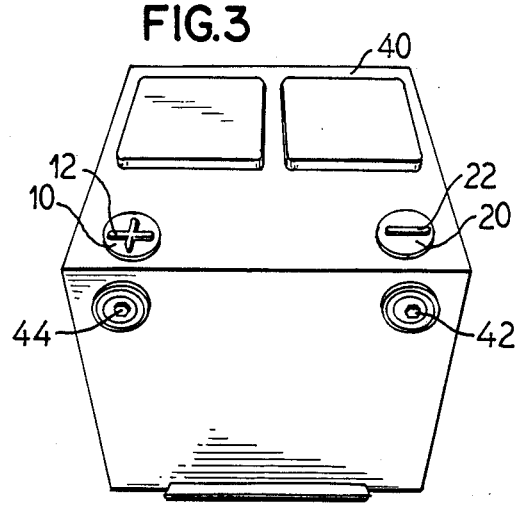

BATTERY MARKERS

BACKGROUND OF THE INVENTION

The present invention relates generally to storage batteries for motor vehicles and the like and, particularly, to markers for identifying the polarity of the terminals of a battery.

When new batteries are placed in motor vehicles and the like, they generally are clean and free of dirt, grease, oil, oxidation, and the like. In such a state, it generally is easy to identify the polarities of the terminals of the battery as manufacturers place appropriate indicia either on the terminals in the form of stampings, etchings, or the like or on a surface of the battery casing near the terminals in the form of painted markings, stampings, or integrally molded indicia.

Invariably, over time, as the batteries become dirty due to the accumulation of dirt, grime, grease, and the like, and corrosion due to leaking battery acid, such indicia become worn away or are difficult to see. Moreover, even with the assistance of a light source such as a flashlight, the indicia are difficult, if not impossible, to see at night, not only for the reasons presented previously, but also because the indicia are usually small in size or generally indistinct. This can be hazardous when a motor vehicle must be jump started by connecting a fully charged battery in parallel with an uncharged or weak battery, as one can easily be mistaken about the polarities of the terminals and accidentally misconnect the two batteries. Incorrectly connected batteries may overheat and become damaged and have been known to explode.

SUMMARY OF THE INVENTION

The present invention provides a pair of rugged markers that can be attached to the surface of a battery to indicate the polarities of the terminals of the battery. To this end, a kit of markers is provided, each marker including a hard plastic colored disc having on one side thereof a raised indicium and, on the other side thereof, adhesive for attaching the disc to the surface of the battery. The raised indicia and coloring of the disc provide instant terminal identification by sight and touch.

In an embodiment, the adhesive comprises a high temperature resistant foam adhesive tape.

An object of the invention is to provide identification of battery terminals.

Another object of the invention is to provide identification of battery terminals by both sight and touch.

Yet another object of the invention is to provide terminal polarity identifiers for motor vehicle batteries.

A further object of the invention is to provide terminal polarity identifying markers that are easily and readily attachable to a battery.

A principal object of this invention is to provide a kit for retrofit application to existing storage batteries of large stick-on indicia of terminal polarity.

BRIEF DESCRIPTION OF THE DRAWINGS

FIG. 1 is a perspective view of a marker formed in accordance with principles of the invention;

FIG. 2 is a cross-sectional view of the marker of FIG. 1 taken along the line II—II;

FIG. 3 is a perspective view of a battery having side terminals showing the positioning of markers in accordance with principles of the invention;

FIG. 4 is a perspective view of a battery having topside terminals showing the positioning of markers in accordance with principles of the invention; and FIG. 5 is a perspective view of a kit containing markers formed in accordance with principles of the invention.

DETAILED DESCRIPTION OF THE PREFERRED EMBODIMENT

The present invention provides easy and reliable identification of storage battery (such as motor vehicle batteries) terminal polarities by both sight and touch. To this end, there is provided a kit containing a pair of markers having a durable plastic disc with raised indicia on identifying sides thereof and high temperature resistant adhesive tape on adhering sides thereof. One of the markers includes indicium for identifying a positive terminal while the other marker includes indicium for identifying a negative polarity terminal.

In FIGS. 1 and 2 there is illustrated a marker 10 formed in accordance with the principles of the invention. As illustrated, the marker 10 includes a disc 14 on one side 15 of which, the indicating side, there is located a raised indicium 12. The disc 14 preferably is made of a highly durable and rugged hard plastic material, as such material is easily molded and is relatively inexpensive. The indicium 12, in this case a plus sign for identifying a positive polarity terminal, is preferably formed integrally with the formation of the disc 14 and, therefore, of the same material. It can be appreciated that while the disc 14 is illustrated as being in circular form, the disc may just as easily be formed to have a rectangular or hexagonal or other shape.

On an adhering side 17 of the wafer 14, opposite that of the indicating side 15, the marker 10 includes an adhesive tape layer 16. The adhesive tape layer 16 is formed of a double-sided foam adhesive tape that is highly temperature resistant, one side of which is permanently attached or adhered to the disc 14. Such tape is readily available from manufacturers such as the Minnesota Mining and Manufacturing Company. A peel-off laminate 18 is included to cover the otherwise exposed other side or surface of the adhesive tape layer 16 to preserve the tackiness of the adhesive tape 16 until such time as the marker 10 is applied to the surface of a battery. Thus, it can readily be appreciated that the provision of adhesive tape layer 16 on the wafer 14 produces a so-called peel and stick marker 10 that is readily attached to the surface of a battery by simply peeling off the laminate 18 after locating a clean surface on the battery.

It is a feature of this invention that the markers are dimensioned such that they are readily visible and that the indicia are large and easy to view and feel. Thus, the disc may be on the order of approximately 1 inch in diameter with the indicia raised on the order of from 0.05 to 0.1 of an inch.

Illustrated in FIG. 3 is a battery 40 having terminals 42 and 44 projecting from a side 46 thereof. Terminal 42 is the negative polarity terminal while side 44 is the positive polarity terminal. As illustrated, in accordance with principles of the invention, the marker 10, having the plus sign indicium 12, is positioned near the positive terminal 44, while a marker 20, having a minus sign indicium 22, is positioned near the negative terminal 42.

While the markers 10 and 20 are illustrated as being positioned on top of the battery 40, they may also be placed on the side 46 of the battery 40 from which the terminals 42 and 44 protrude. It is only important that the markers 10 and 20 be located near the respective terminals.

Illustrated in FIG. 4 is another battery 50 having terminals 52 and 54 projecting form the topside 56 thereof. The terminal 52 is the negative polarity terminal while the terminal 54 is the positive polarity terminal.

In a fashion similar to that described earlier, the markers 10 and 20 are placed near their respective terminals. Again, it is only important that each marker be placed near the appropriate terminal.

In FIG. 5, there is illustrated a kit containing the marker 10 and the second marker 20 having the minus sign indicium 22 thereon in place of the plus sign indicium 12. The markers 10 and 20 are illustrated as being mounted on a display card 24 having copy written thereon in spaces 26 and 28 and an appropriate illustration 30 indicating the use of the markers 10 and 20. Preferably, the markers 10 and 20 are secured to the display card 24 by means of heat-shrink wrap.

In addition to including the raised indicia 12 and 22 on the markers 10 and 20, respectively, the markers 10 and 20 can be colored to further differentiate between the polarities of the terminals with which they are associated. For example, the marker 10 can be colored red while the marker 20 can be colored black. Further, the indicia 12 and 22 may be colored white so as to stand out visually from the markers on which they are located. Other colors may, of course, be used as well. Additionally, the coloring of the indicia 12 and 22 may be accomplished by painting of the indicia or by use of colored plastic material during the formation of the indicia.

While a preferred embodiment has been shown, modifications and changes may become apparent to those skilled in the art which shall fall whithin the split and scope of the invention. It is intended that such modifications and changes be covered by the attached claims.

We claim:

1. A device for indicating the polarity of a battery terminal, comprising:
    a durable hard plastic disc having an indicating side and an adhering side;
    a heat resistant adhesive layer on the adhering side of the disc adapted to affix the marker to the surface of a battery; and
    a raised portion on said indicating side of said wafer including a raised indicium of one of a plus sign or a minus sign.

2. A device as set forth in claim 1, wherein said adhesive layer comprises a double-sided foam adhesive tape permanently affixed on one side to the adhering side of the marker, the other side of the tape adapted to affix the marker to the surface of a battery.

3. A device as set forth in claim 1, wherein said disc is circular.

4. A device as set forth in claim 3, further including a laminate layer on said other side of the tape to preserve tackiness of the tape until such time as the marker is affixed to the surface of a battery.

5. A retrofit kit for indicating the polarity of positive and negative terminals of a battery, comprising:
    a pair of markers, each marker including a disc formed of a hard durable plastic material and having an indicating side and an adhering side;
    a raised indicium on each marker on the indicating sides thereof, one marker having a raised plus sign, the other marker having a raised minus sign; and
    an adhesive layer on the adhering side of each marker adapted to affix the marker to a battery surface.

6. A kit for indicating the polarity of positive and negative terminals of a battery according to claim 5, wherein said disc is circular.

7. A kit for indicating the polarity of positive and negative terminals indicating the polarity of positive and negative terminals of a battery according to claim 6, wherein the markers are of different colors, the marker having the plus sign being red, the marker having the minus sign being black.

8. A kit for indicating the polarity of positive and negative terminals of a battery according to claim 7, wherein the indicia on the markers are colored white and wherein the disc is approximately 1 inch in diameter and the indicia are raised from the indicating surface by at least 0.06 inches.

9. A kit for indicating the polarity of positive and negative terminals of a battery according to claim 8, further comprising a display card upon which the markers are temporarily secured and displayed.

10. A device as set forth in claim 5, wherein said adhesive layer comprises a double-sided foam adhesive tape permanently affixed on one side to the adhering side of the marker, the other side of the tape adapted to affix the marker to the surface of a battery.

* * * * *